No. 674,264. Patented May 14, 1901.
J. W. GONCE.
ELEVATED RAILWAY.
(Application filed Aug. 11, 1900.)
(No Model.) 7 Sheets—Sheet 1.

WITNESSES: INVENTOR
Edward Thorpe John W. Gonce.
C. R. Ferguson BY Munn
ATTORNEYS

THE NORRIS PETERS CO., PHOTO-LITHO., WASHINGTON, D. C.

No. 674,264. Patented May 14, 1901.
J. W. GONCE.
ELEVATED RAILWAY.
(Application filed Aug. 11, 1900.)
(No Model.) 7 Sheets—Sheet 2.

WITNESSES:
Edward Thorpe
C. R. Ferguson

INVENTOR
John W. Gonce.
BY Munn/Co.
ATTORNEYS

No. 674,264. Patented May 14, 1901.
J. W. GONCE.
ELEVATED RAILWAY.
(Application filed Aug. 11, 1900.)
(No Model.) 7 Sheets—Sheet 3.

WITNESSES:

INVENTOR
John W. Gonce.
BY
ATTORNEYS

No. 674,264. Patented May 14, 1901.
J. W. GONCE.
ELEVATED RAILWAY.
(Application filed Aug. 11, 1900.)
(No Model.) 7 Sheets—Sheet 4.

WITNESSES:
Edward Thorpe
C. R. Ferguson

INVENTOR
John W. Gonce.
BY
ATTORNEYS

THE NORRIS PETERS CO., PHOTO-LITHO., WASHINGTON, D. C.

No. 674,264. Patented May 14, 1901.
J. W. GONCE.
ELEVATED RAILWAY.
(Application filed Aug. 11, 1900.)
(No Model.) 7 Sheets—Sheet 5.

WITNESSES:
Edward Thorpe
C. R. Ferguson

INVENTOR
John W. Gonce.
BY
ATTORNEYS

THE NORRIS PETERS CO., PHOTO-LITHO., WASHINGTON, D. C.

No. 674,264. Patented May 14, 1901.
J. W. GONCE.
ELEVATED RAILWAY.
(Application filed Aug. 11, 1900.)
(No Model.) 7 Sheets—Sheet 6.

WITNESSES:
Edward Thorpe

INVENTOR
John W. Gonce.
BY
ATTORNEYS

No. 674,264. Patented May 14, 1901.
J. W. GONCE.
ELEVATED RAILWAY.
(Application filed Aug. 11, 1900.)
(No Model.) 7 Sheets—Sheet 7.

WITNESSES:

INVENTOR
John W. Gonce.
BY
ATTORNEYS

UNITED STATES PATENT OFFICE.

JOHN W. GONCE, OF KINDERHOOK, ALABAMA.

ELEVATED RAILWAY.

SPECIFICATION forming part of Letters Patent No. 674,264, dated May 14, 1901.

Application filed August 11, 1900. Serial No. 26,608. (No model.)

*To all whom it may concern:*

Be it known that I, JOHN W. GONCE, a citizen of the United States, and a resident of Kinderhook, in the county of Jackson and State of Alabama, have invented a new and Improved Elevated Railway, of which the following is a full, clear, and exact description.

This invention relates to improvements in elevated or suspended railways; and the object is to provide a railway particularly adapted to supply the wants of communities where there is not enough traffic to justify the expense of operating a surface railway of the usual construction, and, further, to provide a railway that may be cheaply constructed over level or hilly country and that will require very little expense to keep it in order, and, further, the railway may be constructed with either single or double tracks, and so designed that a uniform tension will be maintained in the tracks and supporting-cables during the varying changes of the weather or seasons. This is mostly effected by mechanism deflecting the track laterally at intervals from a straight line and sometimes by a lengthwise pull on rails and cables.

I will describe an electric railway embodying my invention and then point out the novel features in the appended claims.

Reference is to be had to the accompanying drawings, forming a part of this specification, in which similar characters of reference indicate corresponding parts in all the figures.

Fig. 19 is a side view thereof. Figs. 20, 21, and 22 are detail views to be hereinafter referred to.

Figure 1:
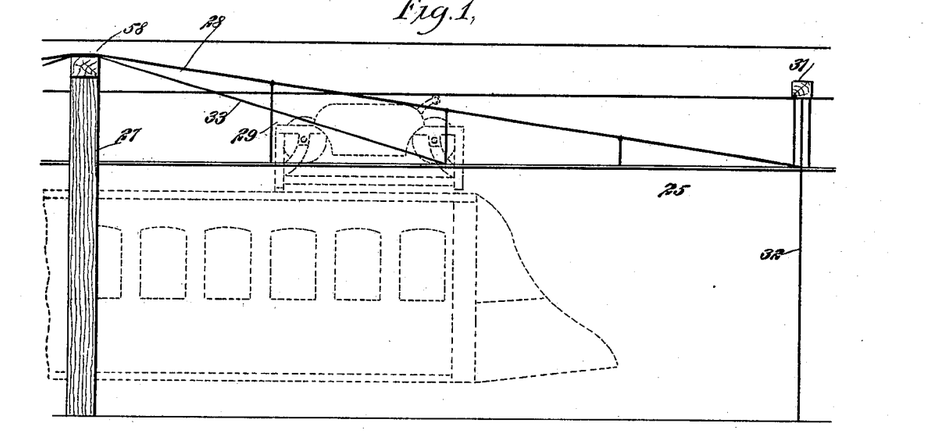
Figure 1 is a side elevation of a half-span of a double-track railway embodying my invention.

By referring to Fig. 1 it will be seen that the rails 25 are elevated on supports, which consist of a horizontal beam arranged on an upright or uprights 27, these uprights or posts being sunk into the ground or rested on a ground-sill, or the beam may be otherwise supported, and I will here state that all my supporting and tension mechanisms may be mounted on a horizontal beam supported in any suitable manner. The rails are held up by cables 28 in connection with hangers 29, which connect the said cables to cross-ties 30 at regular intervals. The cross-ties are adapted to be bolted to the stem of the rail. A straining-beam 31 may be placed over the center of each span and anchored to the earth or other suitable support by rods 32. If considerable deflection is given to the cables, this straining-beam becomes quite necessary. There may be another shorter cable 33 deflected from the top of the support 58 to a cross-tie near the center of each half-span.

Figure 2:
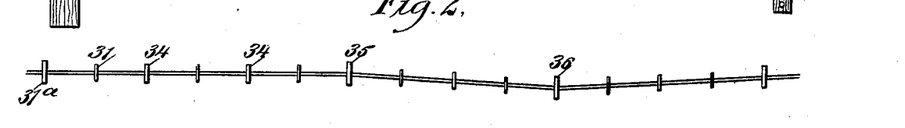
Fig. 2 is a plan showing both straight and curved sections.

Fig. 2 is a plan of a railway including both straight and curved sections, in which 31ª shows the lengthwise tension-post, 31 the straining-beams, and 34 intermediate posts. 35 indicates stationary posts, and 36 a transverse tension-post, all of which are used for single tracks, while the corresponding posts for double tracks are indicated in the figures.

Figure 3:
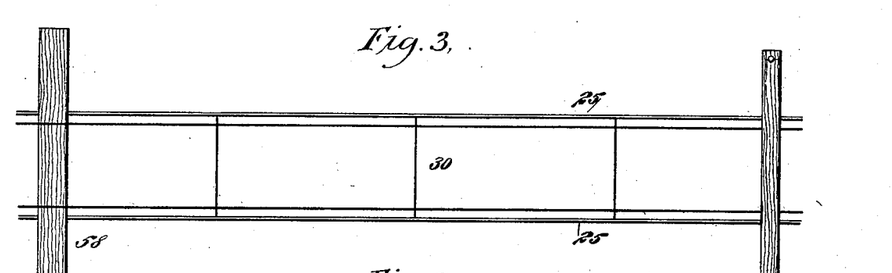
Figs. 3 and 4 are plans of both double and single track sections, showing a half-span of each.
Figure 4:
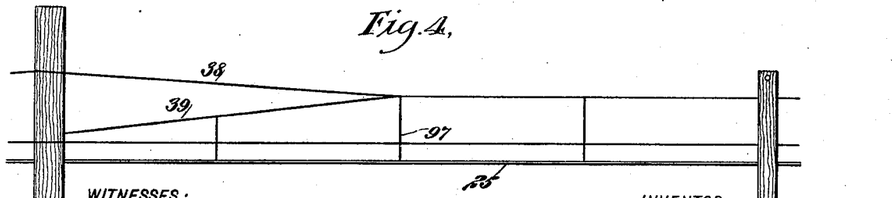
Figure 27:
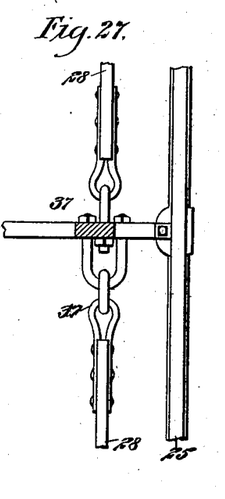
Fig. 27 is a plan thereof.

By referring to Fig. 3 it will be seen that the rails 25 are parallel and connected at regular intervals by cross-ties 30, which, as before stated, have connection with hangers 29. The cables 28 run over the beams and then to the central cross-tie of each span, and there are connected by I-bolts 37, as indicated in Fig. 27, and this applies to main cables of single tracks also. The cross-arms of single tracks are supported at their inner ends by cables 38 and 39, as indicated in Fig. 4.

Figure 5:
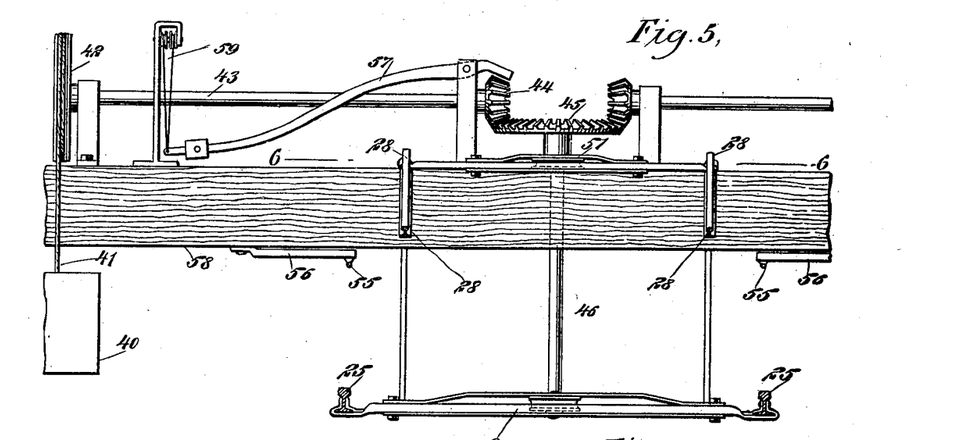
Fig. 5 is an end view of a lengthwise tension-post for a double track.
Figure 6:
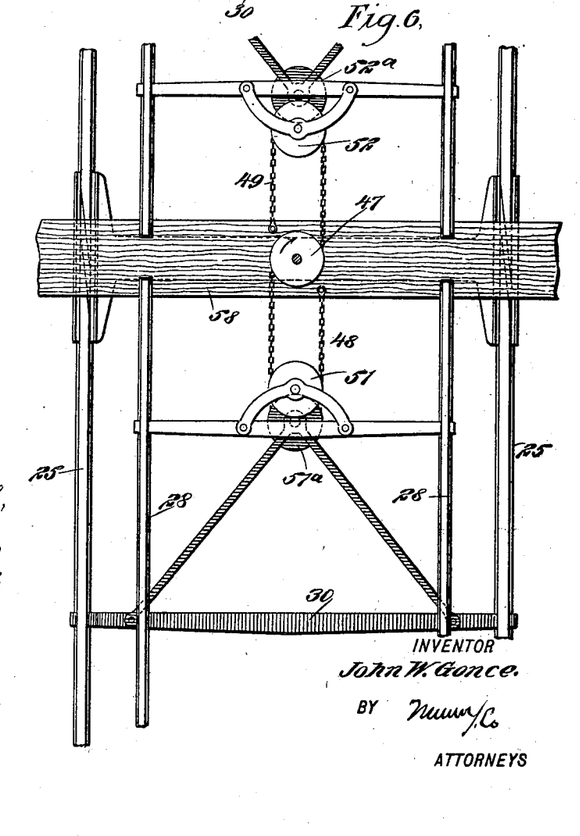
Fig. 6 is a plan view thereof.

By referring to Fig. 5 it will be seen that a weight 40 acts on the cables and rails through a rope or chain 41, wrapped by two or three turns around a drum 42, attached to a shaft 43, carrying a bevel-gear 44, which engages a bevel-wheel 45 on a shaft 46. To this shaft is fixed a double chain or rope pulley 47, which during the fall of the weight 40 is given less than half-revolution. To this pulley 47 the cables are attached by chains or ropes 48 49, one end of each of which is fixed to a beam 58, and then the chains are passed around movable pulleys 51 and 52, attached by suitable bars connecting the cables, and the rails are attached to a lower pulley on the shaft 46 by chains passing around pulleys 51$^a$ and 52$^a$, attached to the cross-ties 30, and in such a manner that there will be no lateral strain on the supports. Each chain-pulley makes less than a half-revolution. It will be seen that when the rails and cables expand the tension-chains 48 and 49 will be slackened and the weight 40 will drop, taking up the slack, while by a reverse motion or contraction of the rails and cables the weight will rise.

Figures 7, 8:
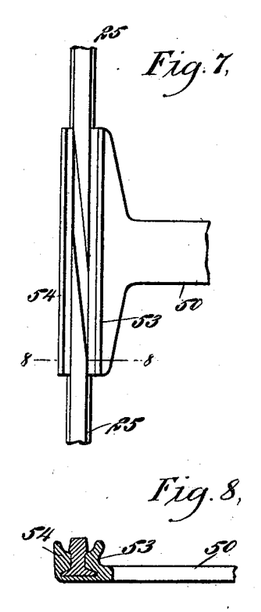
Fig. 7 is a plan illustrating the rail-joints.
Fig. 8 is a section on the line 8 8 of Fig. 7.

The rails at all lengthwise tension-posts are divided and may be planed to a point either diagonally or straight. I have shown this construction in Fig. 7, in which the ends of the rails are shown as wedge-shaped or pointed, and these ends are mounted to slide in boxes consisting of a flange 53, attached to a bar 50 and engaging against one side of the rails, and a tie-plate 54, engaging against the opposite side and also attached to the bar. This flange and tie-plate are depressed, as indicated in Fig. 8, so that the flange of a car-wheel may pass smoothly over the same. It is to be understood that the rails at the points are not designed to slide more than two or three inches, as a good part of the annual expansion and contraction may be taken up quarterly or semi-annually at the stationary posts, which are designed to facilitate this operation, as will be explained later.

The cars on my railway may be operated by steam, gas, or electricity or any other suitable power. If operated by electricity, conductors 55 at lengthwise tension-posts are connected by a fixed wire carried over the horizontal beam or arm, while the ends of the main wire are supported on springs 56, which will allow them to contract and expand. The contraction and expansion between the intermediate posts will be regulated by said posts.

As indicated in Fig. 5, there may be two shafts 43, with the operating mechanism the same as that shown at the left-hand side of said figure. A stop-lever 57 is pivoted to one of the standards in which the shaft 43 has its bearing, it being remembered that all these parts are supported on a cross-arm 58. This stop-lever is designed to be acted on by a rope or wire 59, connecting it with stop-levers on intermediate posts, and when raised by said wire 59 it will engage one of the teeth of the bevel-gear 44 and stop any movement or slackening of tension while a car is on any tension-section.

Figure 18:
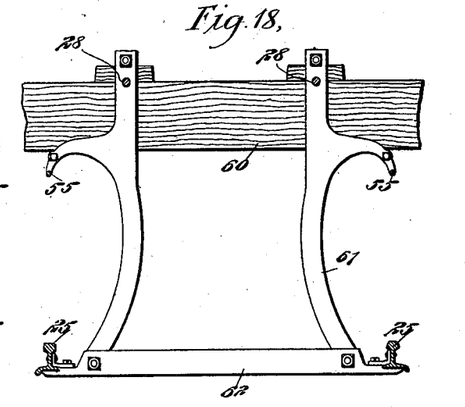
Fig. 18 is an end view of a double-track stationary post.
Figures 19, 21, 22:
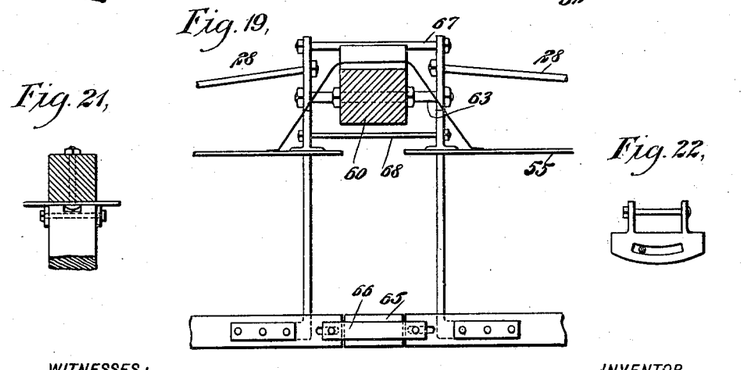
Figure 20:
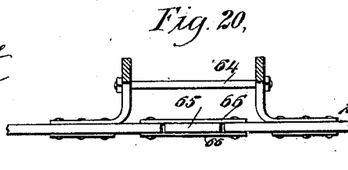

The double-track stationary posts or arms 60 are indicated in Figs. 18 and 19. Suspended from this part 60 are cross-ties 62. The hangers 61 are bolted to opposite sides of the beam or arm 60 by bolts 63, whereby they may have movement toward or from said arm for about three inches, more or less. They are also connected near the rails by a bolt 64. (Shown in Fig. 20.) To these hangers are attached the rails 25, the cables 28, and the conductors 55. The rails are shown in Figs. 19 and 20 as arranged or fixed for low temperature with a section of rail 65 held between fish-plates 66.

The method of regulating is as follows: As the weather becomes warm and the weight 40 is hanging close to the ground, said weight is first raised to about the middle of its drop at mean temperature and then the plates 66 are taken off and the short section or rail 65 is taken out. Then the bolts 63, 64, 67, and 68 are screwed up until the rails come in contact with a shorter section 65 (or like 65) or each other, as the case may be. Then plates 66 are again bolted on, the bolts passing through slots formed in the stems of the rails. This provides for a lengthwise movement of the rails relatively to each other. If the regulation of the system as to its expansion and contraction is made quarterly, a shorter section 65 will be introduced or taken out; but if the regulation is only made semi-annually this shorter section will not be required.

Figures 13, 14:
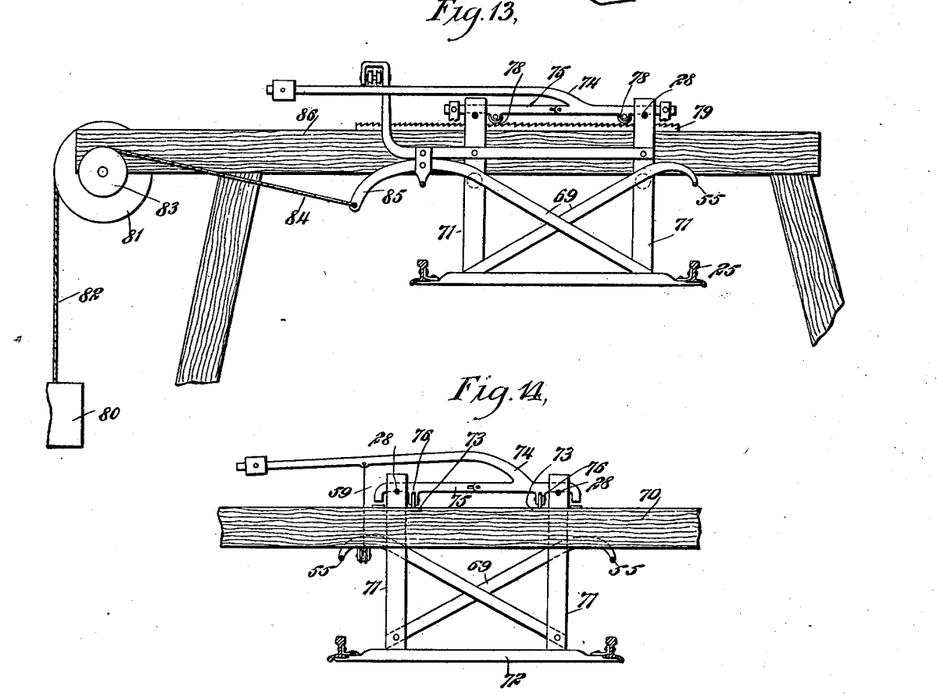
Fig. 13 is an end view of a double-track transverse tension-post.
Fig. 14 is an end view of another form of double-track intermediate post and adapted for straight tracks.
Figure 15:
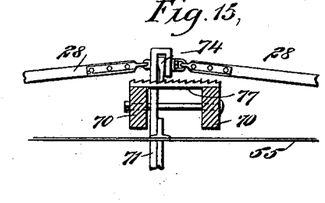
Fig. 15 is a side view thereof.

My double-track lengthwise intermediate post is shown in Figs. 14 and 15 to be used in conjunction with a lengthwise tension-post shown in Fig. 5. The uprights or cross-braces are indicated by 69, each carrying a track, cables, and conductors. The arm 70 is in this case divided into two sections spaced apart, as indicated in Fig. 15, and these sections are bolted to opposite sides of the supporting-post. The uprights 71, to the lower end of which cross-ties 72 are attached, extend upward between the sections of the supporting arm or beam, and extended from one section to the other of said arm or beam are grooved tracks 73. The uprights 71 at their upper ends rest on joints or sections 74 75 of a compound lever, these sections being pivoted together at their inner ends and having near their outer ends rollers or wheels 76, which engage on the tracks 73. Therefore this frame, comprising the uprights 71, may move transversely of the arm or beam 70, the wheels 76 rolling on the tracks 73 and lengthwise of the track-rail, so that when a car runs on the span next to this mechanism its weight raises the weighted lever 74, which then shifts the weight of the track, car, &c., to the outer end of the levers 74 and 75, which then rest on bars 77, which are provided with teeth with which the ends of these lever-sections engage. At the same time this movement draws up a section of the wire 59, which communicates with a tension-post and prevents any movement of the tension mechanism and of course any diminishing of tension. It will be seen that this mechanism is only a slight modification of the double-track device shown in Fig. 13, and my transverse intermediate post will answer equally for straight tracks by allowing the supporting-beams to rock on their foundations or swing slightly.

In Fig. 13 is shown a double-track transverse tension-post and tension mechanism, which consists of a frame having the parts 69 and 71, which have a transverse movement to the line of the railway and carry the tracks 25 and cables 28 and the conductors 55. This frame is supported by the jointed levers 74 and 75, which are supported by rollers 78, resting and adapted to roll on a track 79. The tension of the track is regulated by the transverse movement of the frame, which is controlled and balanced by a weight 80, attached to a drum 81 by means of a cord or chain 82, which has one or more turns around said drum. On the shaft of the drum 81 is a pulley 83, and this pulley 83 is connected by a rope or chain 84 to the arm 85, extended from the frame. This arm may be attached to the other side of said frame, or the entire frame may be turned around and attached to the other side of the beam or arm 86. When from an increase of temperature the rails, cables, and wires expand, the weight 80 descends, taking up any slack, and thus equalizing and maintaining the tension. A contraction of the rails, cables, &c., causes a reverse movement, raising the weight. While the track is unloaded, its weight is supported by the rollers 78, which travel on the track 79; but when a car moves onto an adjacent span the weight of the car overbalances the weight of the counterbalance on the lever 74, and this weight is then shifted to the opposite loop of the uprights 71 and devices on the ends of the lever-sections 74 and 75, which engage with teeth formed on the track 79, thereby preventing any lateral movement of the frame while the track is loaded.

Figure 9:
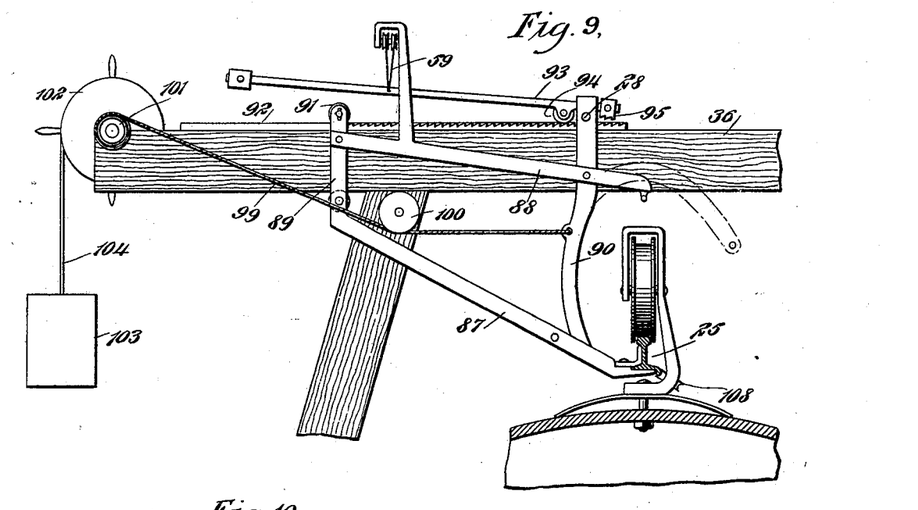
Fig. 9 is an end view of a modified form of tension device.
Figure 10:
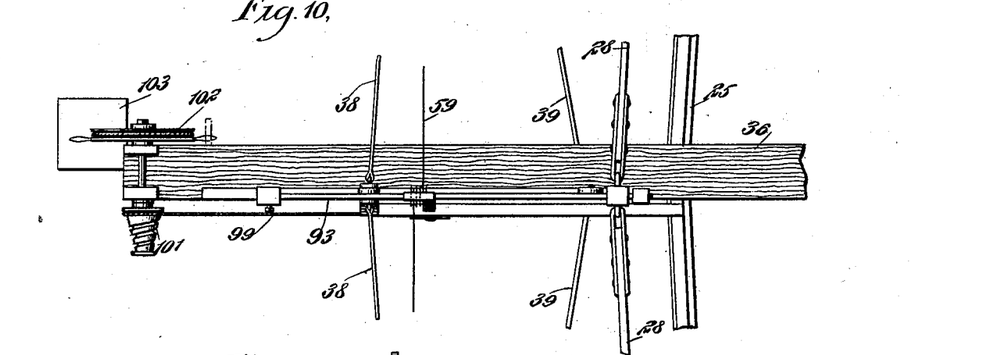
Fig. 10 is a plan view thereof.
Figure 11:
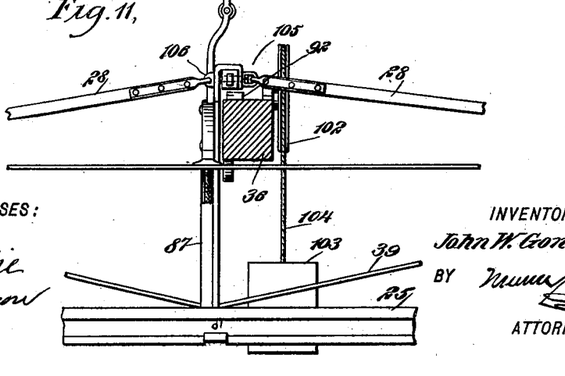
Fig. 11 is a side elevation thereof.
Figure 26:
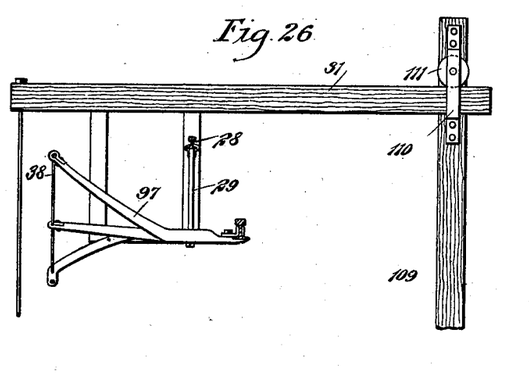
Fig. 26 is a cross-section of single track between supports, showing a straining-beam.

Figs. 9, 10, and 11 show end, top, and side views of my single-track transverse tension-post mechanism, which is designed to regulate and equalize the tension of tracks and cables by a transverse movement of the frame, comprising the bars 87 88, which are connected together at the ends by hangers 89 and 90. The upright or hanger 89 has a roller 91, which moves on a track 92, and the upright or hanger 90 is attached to a lever 93, having a roller 94 adapted to move on said track 92, and on this lever is a toothed block 95, adapted to engage with teeth formed on the track 92. In a single-track system there are two cables 28 and 38, which support the track by a downward pull on one and an upward thrust on the other. The said other cable is indicated at 38 in Fig. 24. An upward thrust is imparted by means of the cable 38 engaging with a cross-arm 97, connected to the track-rail. This cross-arm is also supported by the hangers 29, before described, and which depend from the cable 28. It may be here stated that this cable 28, as clearly indicated in the drawings and particularly in Fig. 26, is made in the form of a T or I-beam, but it is to be understood that it may be a rod or twisted-wire cable. It is, however, believed that a T or I rail form is better on account of its stiffness, which is required to support the track between supports and center of spans. The cable 38 may be also supported against upward strain of the cross-arm 97 by means of a short cable 39, which extends from the base of the track-frame upward to the cable 38, near the center of each half-span. In Fig. 9 the track is shown as deflected to the left. When necessary to deflect it to the right, it is only required to run the rope or cable 99 from the inner end of bar 87 of track-supporting frame around or rather underneath a pulley 100 and thence to a pulley 101, on the shaft of which is a drum 102, suspending a weight 103 by means of a rope or cable 104. The pulley 101 is in the form of a diminishing cone-pulley, so that the weight 103 becomes more effective as it descends, and which is necessary because the greater the deflection the more weight becomes necessary to maintain a given tension. The operation of this tension device is similar to that hereinbefore described in connection with Fig. 13. A spur wheel or pinion may be substituted for pulley 101, and a bar attached at one end to upright 90, having the other end notched and placed in contact with the pinion, may be substituted for the rope 99 and the transverse movements of track-frame effected in that way.

In Fig. 11 I have shown a means for attaching the cables 28 to the head of the track-supporting frame, and this same means may be employed at intermediate posts and at all transverse tension-posts. One cable 28 is attached to an eyebolt 105, while the other is attached to the loop 106. The eyebolt 105 passes through the loop just above the track 92. In this way there can be no side strain on the head of the frame and very little strain at all, as the strain on one side nearly equalizes the strain on the other. The movements lengthwise or lateral at all intermediate posts are effected entirely by the strain of the rails and cables and not directly by a weight, as at tension-posts.

Figure 12:
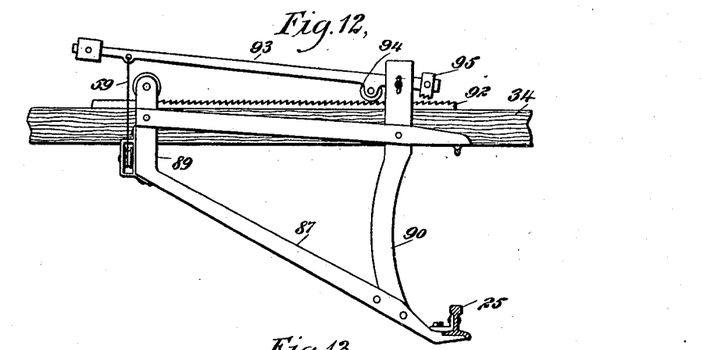
Fig. 12 is an end view of another modification for a single-track intermediate post.

Fig. 12 is an end view of a single-track transverse intermediate post used in connection with Fig. 9, which needs no extensive description, as its operation is similar to that described in connection with Fig. 9 as far as the lateral movements are concerned. This simplified form of device may be used for a straight track.

Figure 23:
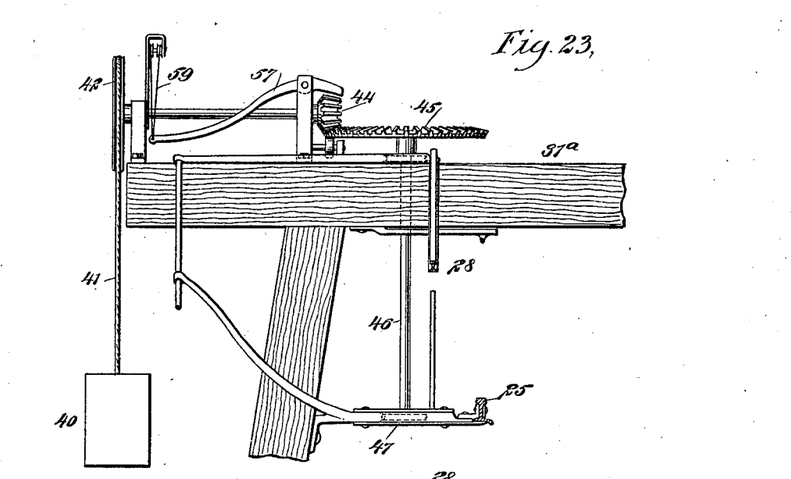
Fig. 23 is an end view of a single-track lengthwise tension-post.
Figure 24:
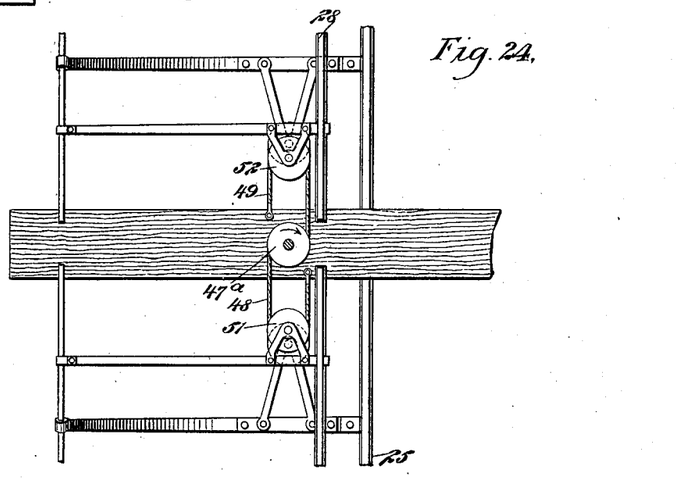
Fig. 24 is a plan of the same, plainly showing the cable-stretching mechanism.
Figure 25:
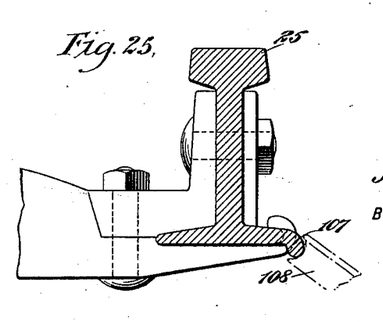
Fig. 25 is a section of a track, showing a clamping device therefor.

Figs. 23 and 24 show an end view and a plan view of single-track lengthwise tension posts or devices somewhat similar to that shown in Fig. 5. In Fig. 23 I have shown a plan of a mechanism for stretching the cables similar to that shown in Fig. 5, while the rails are stretched by similar mechanism attached to the base-plate on which shaft 46 rests. Both ends of the track and cables are provided with the same kind of mechanism indicated in Fig. 5. In my invention while the ordinary T-rail for the track 25 may be employed, I prefer the rail shown in Fig. 25, which has on one side of its base a downwardly-curved flange portion 107, to be engaged by a roller 108, attached to a car-truck. The shaft of this roller and its position with reference to the track will not only prevent any serious lateral vibration of the car, but will also operate to prevent the truck-wheels from jumping the track. The form and position of roller 108 will not interfere with the use of switch-points resting on the track-rails, for as the truck-wheels mount the switch-point the roller 108 will gradually climb up the rounded surface of the part 107 on the main track-rail and engage with that of the switch-point. The roller 108 is designed to press only very slightly against the rail when a car is hanging vertically.

Figure 16:
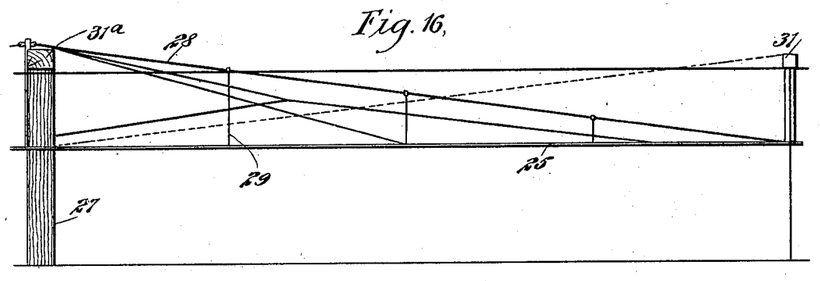
Fig. 16 is a side elevation of a half-span of a single track.

Fig. 16 is a side elevation of a half-span of single-track railway, which shows the arrangement of the cable-arms, &c. This figure shows anchor-rods attached to the straining-beam 31, but by reference to Fig. 26 it may be seen that I may also employ a post 109 instead of the wire or rope for anchoring the beam, and when so used will afford some support to the center of the span. The beam 31 runs between the post 109 and a plate 110 secured thereto, and it passes underneath a roller 111, mounted between said plate and the post, so as not to interfere with the lateral movement of the track. The post 109 may be pivoted to a post near the ground and then loosely bolted to the beam 31 instead of in the manner shown in said Fig. 26.

Figure 17:
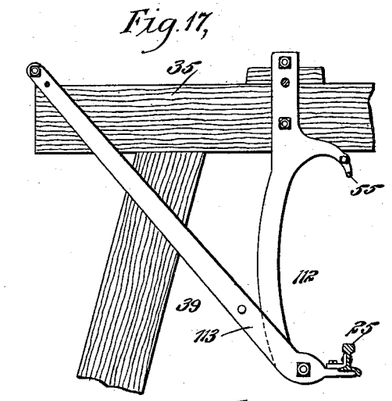
Fig. 17 is an end view of a single-track stationary post.

In Fig. 17 I have shown an end view of my single-track stationary post, which is only a slight modification of the double-track stationary post. This device shows two hanger plates or arms 112 and 113, of which there is a pair of each, connected by suitable bolts, so that they may be drawn together as described in connection with Figs. 18 and 19.

Having thus described my invention, I claim as new and desire to secure by Letters Patent—

1. A suspended-railway rail, means for deflecting the rail laterally when expanding or contracting, and means actuated by the weight of a train for holding the rail in its adjusted position, substantially as specified.

2. A suspended railway, suspending-cables for sustaining the rail, a suspending device for supporting the rail and cable, and a counterbalance for moving the said supporting device in one direction upon the expansion of the rail, the said supporting device being moved in the opposite direction by the contraction of the rail, substantially as specified.

3. In a suspended railway, a suspended track, supporting-posts, track-supporting arms or frames movable transversely of the posts, and weight-operated mechanism for moving the frame in one direction, substantially as specified.

4. In a suspended-railway system, a suspended track, supporting-posts, frames movable transversely of the posts and with which the track is connected, a suspending-cable for connection with said frame and also having connection with parts extended from the track between the supporting-posts, and weight-actuated mechanism for holding said frame in one direction upon the expansion of the track, substantially as specified.

5. In a suspended railway, a suspended track, supporting-posts, frames movable transversely of said posts and to which the track is connected, levers carried by the frames, and dropping or holding devices on the lever, substantially as specified.

6. In an elevated railway, supporting-posts, frames movable transversely of said posts, a track attached to said frames, intermediate supporting-posts for the track, and a supporting-cable for the track, substantially as specified.

7. A supporting device for an elevated railway, comprising a supporting-post, a track-supporting frame movable transversely of the post, and a weight for moving said frame in one direction, substantially as specified.

8. In an elevated railway, supporting-posts, frames supported lengthwise on arms or timbers extended horizontally on the upper ends of said posts, the said frames being also movable transversely of said arms, a track-rail supported by said frame, and supporting-cables connecting with said frame, substantially as specified.

9. In an elevated railway, a support comprising a horizontally-disposed arm or beam, a track thereon having teeth, a frame, a compound lever mounted to move on said track and adapted for locking engagement with the teeth, and a weight for moving the frame in one direction, substantially as specified.

10. In an elevated railway, a horizontal supporting arm or timber, a frame mounted to move on said arm or timber, and means operated by the weight of a train for locking said frame in its adjusted position, substantially as specified.

11. In an elevated railway, a horizontally-disposed beam or arm, a shaft extended through said beam or arm, a cross-bar for supporting rails and in which the lower end of said shaft has a bearing, means for automatically rotating said shaft, and connections with said shaft for moving the track-rails lengthwise, substantially as specified.

12. In an elevated railway, rails having their adjacent ends tapered and overlapped, tie-rods, guides at the ends of said tie-rods in which the rails may move longitudinally, and means for moving said overlapping ends one upon the other, substantially as specified.

13. In an elevated railway, a supporting-arm extending horizontally, a frame mounted to move longitudinally on said arm, supporting-cables having connection with said arm and with cross-ties of the track, and an electric conductor carried by the frame, substantially as specified.

In testimony whereof I have signed my name to this specification in the presence of two subscribing witnesses.

J. W. GONCE.

Witnesses:
J. L. GONCE,
C. W. TAYLOR.